No. 610,594. Patented Sept. 13, 1898.
A. J. WHITBECK.
BICYCLE TIRE REPAIR KIT.
(Application filed Feb. 9, 1898.)
(No Model.)
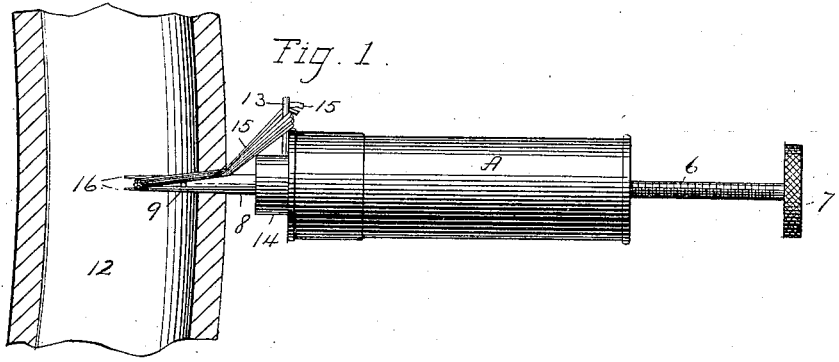
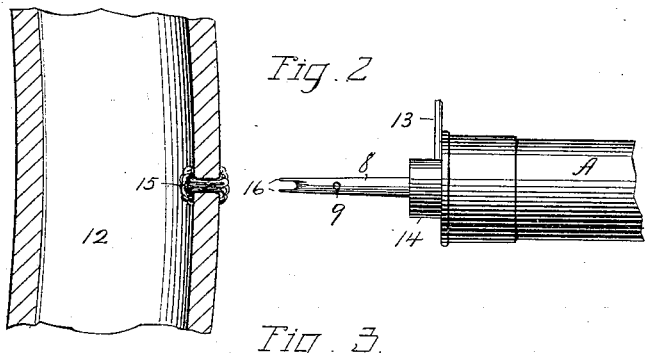
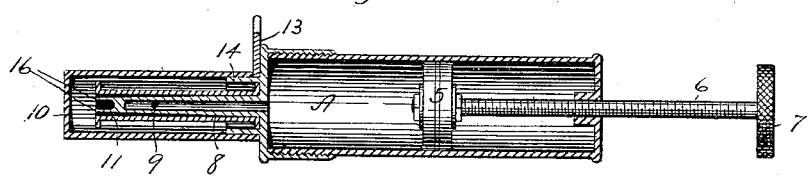
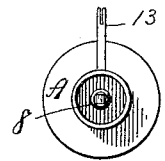
Witnesses
Inventor
Arthur J. Whitbeck.
By James Shepard
Atty.

UNITED STATES PATENT OFFICE.

ARTHUR J. WHITBECK, OF NEW BRITAIN, CONNECTICUT.

BICYCLE-TIRE-REPAIR KIT.

SPECIFICATION forming part of Letters Patent No. 610,594, dated September 13, 1898.

Application filed February 9, 1898. Serial No. 669,643. (No model.)

*To all whom it may concern:*

Be it known that I, ARTHUR J. WHITBECK, a citizen of the United States, residing at New Britain, in the county of Hartford and State of Connecticut, have invented certain new and useful Improvements in Bicycle-Tire-Repair Kits, of which the following is a specification.

My invention relates to improvements in bicycle-tire-repair kits; and the objects of my improvement are simplicity and convenience in repairing the tire and efficiency in the mended tire.

In the accompanying drawings, Figure 1 is a side elevation of my implement for applying a filling and cement to a punctured bicycle-tire together with a portion of a tire in section. Fig. 2 is a like view of a portion of the same with the implement removed from the tire. Fig. 3 is a central longitudinal section, partly in elevation, of the said implement, together with the filler-carrying spool and a cap for covering the effluent end of the implement; and Fig. 4 is an end view of the implement, showing the effluent end.

A designates the cylinder of a pump or syringe having the usual piston 5, piston-rod 6, and handle 7. I prefer to make the piston-rod screw-threaded, as shown, so that the piston can be moved slowly to force out the gum by revolving said rod. The nozzle or needle 8 is made solid at its end and is provided with a discharge-orifice or orifices 9 on its side or sides a distance back from its end. The end of the nozzle is provided with flanges 16, and the implement is provided with a laterally-projecting slitted lug or post 13. Surrounding the nozzle 8 is a cylindrical projection 14 for receiving and holding the cap 10 for covering the nozzle. Upon the nozzle, inside of the cap 10, I may carry a spool 11, upon which spool is wound the rubber strands or thread that I use for filling. Of course the supply of filling may be carried elsewhere, if desired.

For mending a hole in the tire 12, a rubber hose, or other analogous article the cap 10 and spool 11 are removed. The end of a rubber thread or strand 15 is stretched out to make it smaller and then slipped into the slitted end of the lug or post 13 and allowed to contract. Such contraction will enlarge the end of the rubber thread to such an extent that it will not pull through the slit in the post 13. The rubber thread is then stretched out and wound over the end of the nozzle 8 and post 13 while under tension and its opposite end secured in the slitted post, as before described for securing the first end therein. The nozzle, with rubber-thread filling thus stretched thereon, is forced through the hole in the tire until the orifices 9 in the nozzle are inside of the tire, as shown in Fig. 1. The cylinder having been previously filled with suitable cement, the piston is operated to force the cement out through the holes in the nozzle to the outside of said nozzle. The rubber thread may now be released from the post 13 and will immediately gather up in bunches on the outside of the tire and fill the hole in the tire so tightly as to keep the portion of the rubber thread that is inside of the tire stretched so long as the nozzle remains therein. Upon removing the nozzle the cement on its outside is cleanly wiped off and the threads gather up on the inside and draw the cement completely up to the inside of the hole, as shown in Fig. 2. This will hold the cement surely in place until it has hardened, which cement, with the threads, will tightly seal the hole.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. An implement for mending punctured rubber tires and the like, consisting of the cement holding and ejecting mechanism having a nozzle with a discharge-orifice back of its end, and means for holding a rubber thread under tension on said nozzle, substantially as described.

2. A pump or syringe having the nozzle 8 flanged at its end for receiving a thread, a discharge-orifice back of said flanged end and a post or lug over which to wind the thread in conjunction with the flanged end of the said nozzle, substantially as described.

3. The repair-kit consisting of the pump or syringe, with devices upon which to stretch a rubber thread that extends in opposite directions from the discharge-orifice of the pump-nozzle, a thread-holding spool on said nozzle, and a cap covering the said nozzle and spool, substantially as described.

ARTHUR J. WHITBECK.

Witnesses:
A. W. STIPEK,
JAMES SHEPARD.